United States Patent
Nilsson et al.

(10) Patent No.: US 7,021,141 B1
(45) Date of Patent: Apr. 4, 2006

(54) BEAM-TYPE ACCELEROMETER

(75) Inventors: Kenth Nilsson, Åkersberga (SE); Eva Nilsson, Åkersberga (SE)

(73) Assignee: Pacesetter AB, (SE)

( * ) Notice: Subject to any disclaimer, the term of this patent is extended or adjusted under 35 U.S.C. 154(b) by 0 days.

(21) Appl. No.: 09/423,383

(22) PCT Filed: May 4, 1998

(86) PCT No.: PCT/SE98/00816

§ 371 (c)(1),
(2), (4) Date: Nov. 5, 1999

(87) PCT Pub. No.: WO98/50794

PCT Pub. Date: Nov. 12, 1998

(30) Foreign Application Priority Data

May 7, 1997 (SE) .................................. 9701720

(51) Int. Cl.
*G01P 15/09* (2006.01)

(52) U.S. Cl. .............................. 73/514.34; 73/514.34; 73/514.36

(58) Field of Classification Search ............. 73/514.34, 73/514.15, 514.16, 514.29, 514.35, 514.36
See application file for complete search history.

(56) References Cited

U.S. PATENT DOCUMENTS 5,425,750 A  6/1995 Moberg ........................ 607/19

FOREIGN PATENT DOCUMENTS

| EP | 0 355 289 | 2/1990 |
|----|-----------|--------|
| GB | 2 175 090 | 11/1986 |
| GB | 2 224 599 | 5/1990 |
| JP | 5-273227 | * 10/1993 |
| JP | 6-27137 | * 2/1994 |
| WO | WO 89/00294 | 1/1989 |

* cited by examiner

*Primary Examiner*—Helen Kwok
(74) *Attorney, Agent, or Firm*—Schiff Hardin LLP

(57) ABSTRACT

An accelerometer has a cantilever beam supported at one end and having an opposite free end with a longitudinal direction between the supported end and the free end, the beam being formed of a piezoelectric layer and a supporting layer. An inertial, sensing mass is mounted at the free end of the beam, and is located eccentrically relative to the longitudinal direction of the beam. The accelerometer has a primary direction of sensitivity to acceleration forces, and a secondary direction of sensitivity, which is orthogonal to the primary direction and in which the sensitivity is negligible. The secondary direction forms an angle relative to the longitudinal direction of the beam such that a line coinciding with a force proceeding through the center of gravity of the inertial mass, and which is directed in the secondary direction, also intersects the beam.

16 Claims, 2 Drawing Sheets

BEAM-TYPE ACCELEROMETER

FIELD OF THE INVENTION

The present invention relates to a accelerometer of the type having a cantilevered beam with a free end at which an inertial mass is mounted, the beam having a piezoelectric layer and a supporting layer and the inertial mass being located eccentrically relative to the longitudinal direction of the beam.

DESCRIPTION OF THE PRIOR ART

PCT Application Wo 89/00294 discloses a conventional beam type accelerometer of the above kind which comprises two layers, a supporting layer made of silicon and a piezoelectric layer bonded to said layer. This accelerometer is intended to be suitable for mass manufacture from silicon wafers and is also intended to be sensitive in a single plane only relative to its mounting. The accelerometer also is intended to have improved sensitivity.

Although this prior art accelerometer is relatively easy to manufacture, it is sensitive in a plane and it is relatively large, the preferred embodiment having an overall length of about 4 mm.

U.S. Pat. No. 5,425,750 discloses another accelerometer comprising a layered beam. The beam comprises an electrically conducting substrate such as beryllium copper which on each side is covered with a transducing layer of a piezoelectric polymer. The accelerometer is provided with an additional sensing mass in the free end of the beam which is offset in relation to the plane of the beam in order to ensure that the accelerometer is sensitive, in all directions in a plane. This known are electrometer thus also is sensitive in several directions, particularly in a direction which is oriented along the longitudinal extent of the beam, i.e. in a direction which is oriented orthogonally to the main direction of sensitivity. The device further is relatively large (a length of about 4 mm in the preferred embodiment) and is comparatively complicated to manufacture.

In many applications, such as for instance so-called rate-responsive pacemakers, i.e. pacemakers sensing the physical activity of the patient in order to increase or decrease the stimulation rate applied to the heart in dependence on said activity, there is a need of an accelerometer that is easy and inexpensive to manufacture, that has one main sensor sensitivity axis but has a negligible cross sensitivity, i.e. a sensitivity which is negligible in directions orthogonal to said main sensitivity axis, which is designed to be small, which is very sensitive and which is designed to be highly resistant to shocks.

SUMMARY OF THE INVENTION

It is an object of the present invention to provide an accelerometer which meets the aforementioned unsolved needs and which is particularly suited for use in a rate-responsive pacemaker.

The above object is achieved in accordance with the invention in an accelerometer having a cantilevered beam with a free end, the beam being formed of at least one pia layer and at least one supporting layer, with an inertial, sensing mass mounted at the free end of the beam and being located eccentrically relative to the longitudinal axis of the beam, and wherein the accelerometer has a primary direction of sensitivity, and a secondary direction of sensitivity which is orthogonal to the primary direction of sensitivity and in which the sensitivity to acceleration forces is negligible, and wherein the secondary direction forms an angle relative to the longitudinal axis of the beam so that a line coinciding with a force, proceeding through the center of gravity of the inertial mass and which is directed in the secondary direction of sensitivity, also intersects the beam.

DESCRIPTION OF THE PREFERRED EMBODIMENTS

Figure 1:
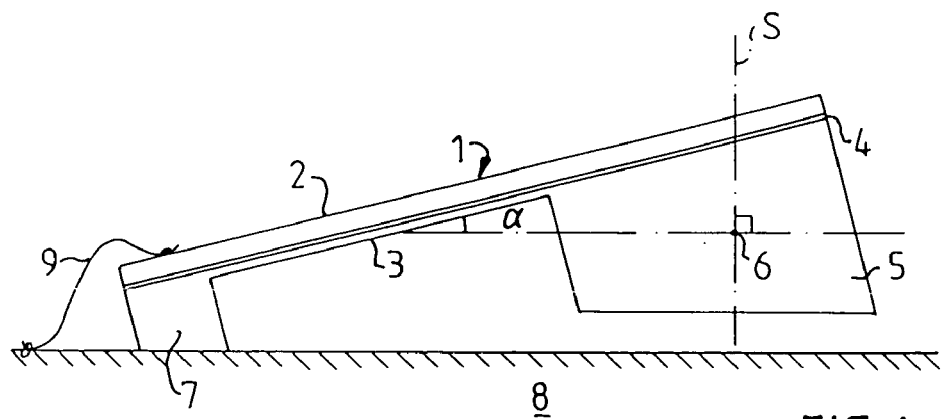
FIG. 1 illustrates a preferred embodiment of the invention.

FIG. 1 illustrates a side view of preferred embodiment of the invention.

A beam 1 comprises a piezoelectric layer 2, which for instance may be made of PZT, and a supporting layer 3. The supporting layer preferably should be of an electrically conducting material and should have a high density. A suitable material is tungsten carbide, preferably binderless tungsten carbide. The two layers are joined together by means of a layer 4 of an electrically conducting glue. The supporting layer at the free end of the beam is enlarged to form a sensing mass 5 which thus is made in one piece with the supporting layer 3. The sensing mass 5 has a center of gravity 6.

Binderless tungsten carbide is a particularly suitable material since it has a high density, is very strong and has a very high modulus of elasticity as well as being electrically conducting.

The high density of the material in the supporting layer 3 results in that the mass of the sensing mass 5 will be larger.

The supporting layer 3 at the opposite end of the beam 1 is also enlarged to form a support 7 which thus also is made in one piece with the supporting layer 3. The support is glued on to the substrate layer 8, which for instance could be a printed circuit board or a thick film substrate. The beam 1 thus will be cantilevered from this support.

The free upper side of the piezoelectric layer 2 is coated with a thin metallic layer serving as an electrode. A lead or band wire 9 connects this electrode with the substrate. Since the supporting layer 3 is electrically conductive, the layer 3 will, in conjunction with the layer 4 of electrically conductive glue, serve as electrode and conductor for the inner side of the piezoelectric layer 2.

Figure 2:
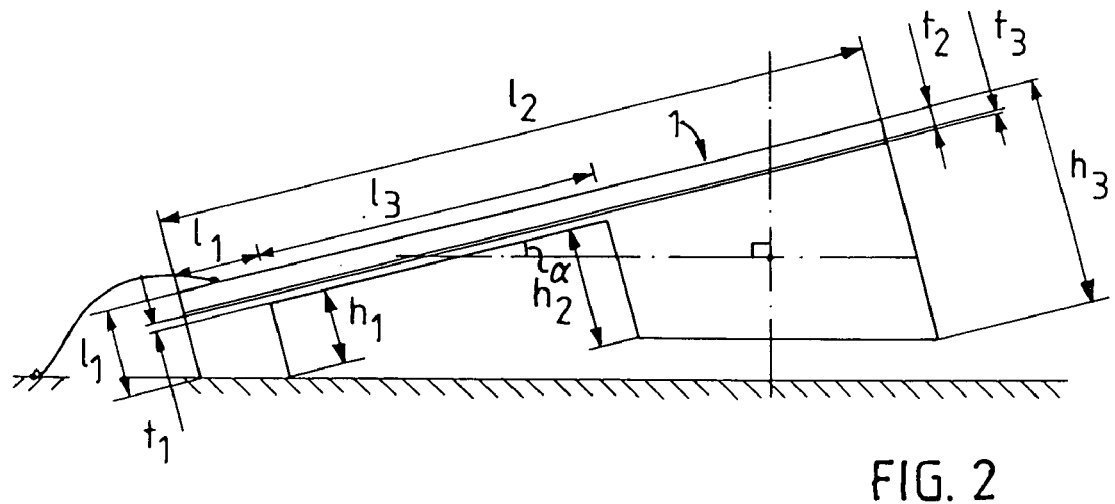
FIG. 2 illustrates the size of the accelerometer in FIG. 1.

FIG. 2 illustrates the size of the preferred embodiment. In this embodiment the two distances $l_1$ defining the size of the support 7 are 290 µm, the height $h_1$ of the support is 259 µm, the overall length $l_2$ of the beam including support and sensing mass is 2434 µm (2.4 mm), and the two heights $h_2$ and $h_3$ defining the size of the sensing mass 5 are 472 respectively 815 µm. The free, deformable length $l_3$ of the beam 1 is 1160 µm, the thickness $t_1$ of the supporting layer 3 is 22 µm, the thickness $t_3$ of the layer bonding the supporting layer 3 and the piezoelectric layer 2 is 10 µm and the thickness $t_2$ of the piezoelectric layer 2 will be 65 µm. The angle $\alpha$ is 14 degrees. The maximal height of the accelerometer over the substrate is 866 µm. The deflection of the free end of the beam 1 under the influence of a force along the primary direction of sensitivity S is in the size order of one nanometer.

The device according to the invention thus may be designed to be much smaller than the prior art devices described above.

The width of the accelerometer may for instance be 760 μm. This width will be sufficient to ensure that the accelerometer is insensitive in directions orthogonal to the plane of the drawing. Apart from the desired rigidity in the direction orthogonal to the plane of the drawing, there are no restrictions on the width.

As indicated above, the supporting layer 3 is made of a material with a very high strength and may thus be made thin in comparison to the piezoelectric layer 2. The supporting layer 3 has a modulus of elasticity which is very high so that, the supporting layer 3 will guide the deflection of the beam 1 in such a way that the neutral layer of the beam 1 will be located close to the boundary between the supporting layer 3 and piezoelectric layer 2 or even in the supporting layer 3. This will ensure that the piezoelectric layer 2 will be deformed in such a way that a very high sensitivity is obtained for deflections in the primary direction of sensitivity S.

The presence of the angle α as defined above has the effect that the sum of the deformations along the beam 1 under the influence of a force which is orthogonal to the primary direction of sensitivity S is negligible. i.e. that the output from the piezoelectric layer 2 as a result of this force will be negligible and that the accelerometer consequently will be insensitive in this direction.

The ratio of the respective moduli of elasticity for the supporting layer 3 and the piezoelectric layer 2 should be in the range 8–12, preferably about 10.

The material in the supporting layer 3 in a preferred embodiment should have a modulus of elasticity $\geq 400$ GPa, preferably $\geq 500$ GPa whereas the material in the piezoelectric layer 2 should have a modulus of elasticity $\leq 40$ GPa, preferably $\leq 50$ Gpa, more preferably $\leq 70$ Gpa. The binderless tungsten carbide used in the preferred embodiment has an modulus of elasticity of about 670 GPa whereas the 5 modulus of elasticity for PZT is about 67 GPa. Both these materials are ceramic materials and are well matched in regard of their thermal expansion coefficients.

A suitable range for the ratio R between the thicknesses of the supporting layer 3 and the piezoelectric layer 2 in this case may be between 2 and 5, in a preferred embodiment about 3.

In the preferred embodiments of the invention, for instance according to FIGS. 1 and 2, α may be in the range $5° \leq \alpha \leq 30°$, suitably in the range $10° \leq \alpha \leq 16°$ and preferably within the range $13.5° \leq \alpha \leq 14.5°$.

Figure 4:
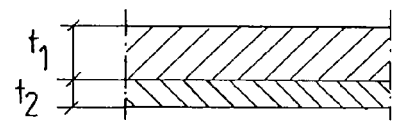
FIG. 4 is a detail of the beam in FIG. 3.
Figure 3:
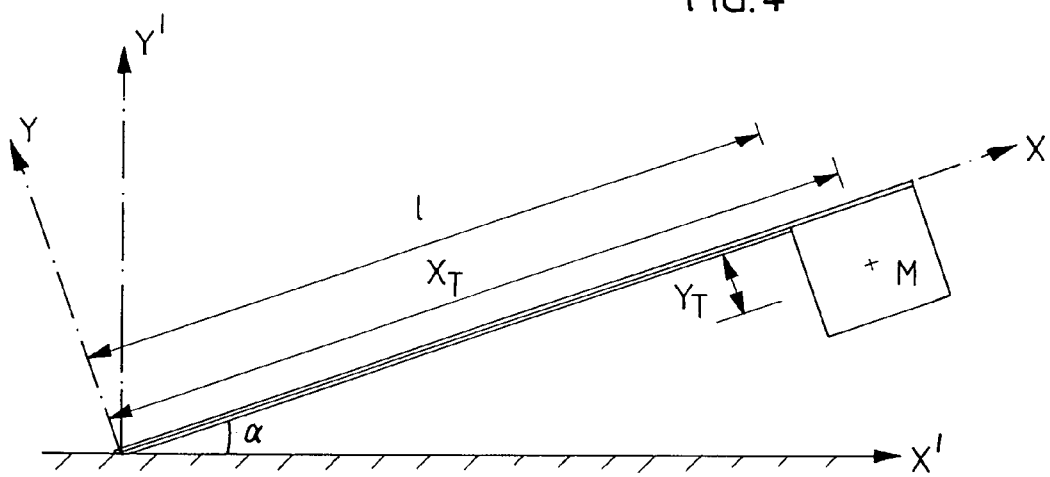
FIG. 3 illustrates a simplified, schematic embodiment of the invention.

The angle α is to some extent dependent on the geometry of beam 1 and sensing mass 5. An idea of this functional relationship may be obtained by means of the idealized and simplified model of the accelerometer shown in FIGS. 3 and 4.

In this model
$X_T$ and $Y_T$ are the coordinates for the center of gravity of the sensing mass 5 in the X-Y-system,
$E_1$ is the modulus of elasticity of the piezoelectric layer 2,
$E_2$ is the modulus of elasticity of the supporting layer 3,
$t_1$ is the thickness of the piezoelectric layer 2,
$t_2$ is the thickness of the supporting layer 3,
l is the deformable length of the beam 1,
$F \approx \alpha$
Y' the primary direction of sensitivity S,
X' the orthogonal direction with negligible sensitivity and
M is the center of gravity of the sensing mass 5.

The weight of the beam 1 is considered negligible in comparison with the weight of the sensing mass 5.

Under these circumstances the following functional relationship can be found, the requirement being that the mean value of the positive stress in the piezoelectric layer 2 is compensated by the mean value of the negative stress in the layers which are caused by a force directed along the X'-axis.

$$F = \arctan \left\{ \frac{E_1^2 t_1^2 (4t_1^2 - 6t_1 t_2 + 3t_2^2) - E_1 E_2 t_1 t_2 [6Y_T(t_1 + t_2) - t_1^2 - 13t_2^2] + E_2^2 t_2^2 [t_2^2 - 6Y_T(t_1 + t_2)]}{3E_2 t_2 (E_1 t_1 + E_2 t_2)(2X_T - l)(t_1 + t_2)} \right\}$$

Under these conditions, F is a fairly good approximation of α. A comparison with the above detailed embodiment described in conjunction with FIGS. 1 and 2 indicates that another way of expressing the variation of α would be $0.7 F \leq \alpha \leq 1.2 F$.

Figure 5:
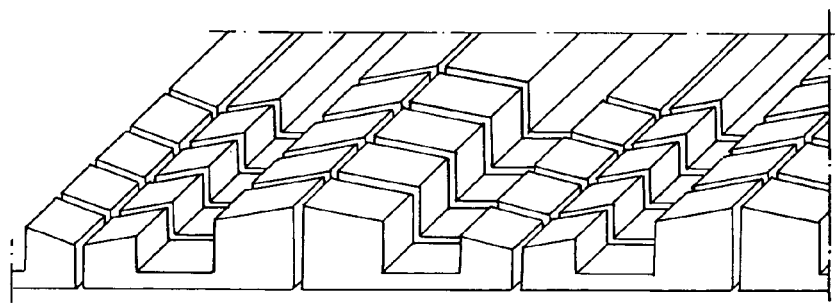
FIG. 5 illustrates a way of manufacturing an accelerometer according to the invention.

As illustrated in FIG. 5, the device can be manufactured from a bilaminar wafer comprising the supporting layer 3 and the piezoelectric layer 2. The wafer may for instance be placed on the vacuum chuck of a so called dice cutter. The dice cutter is programmed to structure the electrically conductive material so that the support, the deflectable part of the beam 1 and the sensing mass 5 are formed. The dice cutter is then used to cut the structured wafer into a large number of individual accelerometers.

By means of the invention an accelerometer is obtained which can be designed to be very small but in spite of this highly sensitive, which has a primary direction of sensitivity S and a negligible cross-sensitivity and which may be designed to be extremely shock-resistant. The accelerometer may have a generally linear response up to accelerations of 100 G and may be designed to withstand shocks up to 1200 G.

Although modifications and changes may be suggested by those skilled in the art, it is the intention of the inventors to embody within the patent warranted hereon all changes and modifications as reasonably and properly come within the scope of their contribution to the art.

The invention claimed is:

1. An accelerometer comprising:
   a cantilevered beam having a fixed end and a free end with a longitudinal direction proceeding between said fixed end and said free end;
   said cantilevered beam being composed of at least one piezoelectric layer and at least one supporting layer;
   an inertial mass mounted at said free end of said cantilevered beam, said inertial mass being disposed eccentrically relative to said longitudinal direction and having a center of gravity; and
   said cantilevered beam and said inertial mass, in combination, having a primary direction of sensitivity to acceleration forces, and a secondary direction of sensitivity to acceleration forces which is orthogonal to said primary direction and in which sensitivity to acceleration forces is negligible, said secondary direction forming an angle α relative to said longitudinal direction so that a line coinciding with a force proceeding through said center of gravity of said inertial mass, and which is directed in said secondary direction, also intersects said cantilevered beam.

2. An accelerometer as claimed in claim 1 wherein said center of gravity of said inertial mass is M and has coordinates $X_T$ and $Y_T$ in an X-Y coordinate system, wherein said piezoelectric layer has a modulus of elasticity of $E_1$ and a thickness $t_1$, wherein said supporting layer has a modulus of elasticity $E_2$ and a thickness $t_2$, and wherein said cantilevered beam has as deformable length l, wherein Y' represents said primary direction of sensitivity and wherein X' represents said secondary direction of sensitivity, and wherein $0.7 \text{ F} \leq \alpha \leq 1.2 \text{ F}$, wherein F=arctan $$\left\{ \frac{E_1^2 t_1^2 (4t_1^2 - 6t_1 t_2 + 3t_2^2) - E_1 E_2 t_1 t_2 [6Y_T(t_1 + t_2) - t_1^2 - 13t_2^2] + E_2^2 t_2^2 [t_2^2 - 6Y_T(t_1 + t_2)]}{3E_2 t_2 (E_1 t_1 + E_2 t_2)(2X_T - l)(t_1 + t_2)} \right\}.$$

3. An accelerometer as claimed in claim 1 wherein $5° \leq \alpha \leq 30°$.

4. An accelerometer as claimed in claim 1 wherein $10° \leq \alpha \leq 16°$.

5. An accelerometer as claimed in claim 1 wherein $13.5° \leq \alpha \leq 14.5°$.

6. An accelerometer as claimed in claim 1 wherein $\alpha = 14°$.

7. An accelerometer as claimed in claim 1 wherein said piezoelectric layer has a modulus of elasticity and a thickness and wherein said supporting layer has a modulus of elasticity and a thickness, and wherein a ratio of the thickness of said piezoelectric layer relative to the thickness of said supporting layer is in a range between 2 and 4 and wherein a ratio of the modulus of elasticity of said supporting layer relative to the modulus of elasticity of said piezoelectric layer is in a range between 8 and 12.

8. An accelerometer as claimed in claim 7 wherein said ratio of said thickness of said piezoelectric layer relative to said thickness of said supporting layer is 3.

9. An accelerometer as claimed in claim 7 wherein said ratio of said modulus of elasticity of said supporting layer relative to said modulus of elasticity of said piezoelectric layer is 10.

10. An accelerometer as claimed in claim 1 wherein said supporting layer has a modulus of elasticity $\geq 400$ GPa.

11. An accelerometer as claimed in claim 1 wherein said supporting layer has a modulus of elasticity which is $\geq 500$ GPa.

12. An accelerometer as claimed in claim 1 wherein said supporting layer is comprised of electrically conducting material.

13. An accelerometer as claimed in claim 1 wherein said supporting layer is comprised of tungsten carbide.

14. An accelerometer as claimed in claim 1 wherein said supporting layer is comprised of binderless tungsten carbide.

15. An accelerometer as claimed in claim 1 wherein said supporting layer and said inertial mass are integrally formed of the same material.

16. An accelerometer as claimed in claim 1 wherein said piezoelectric layer is comprised of PZT.

* * * * *